A. JAKOVLEFF.
SECTIONAL PNEUMATIC TIRE.
APPLICATION FILED JULY 9, 1918. RENEWED AUG. 18, 1919.
1,335,712.
Patented Mar. 30, 1920.
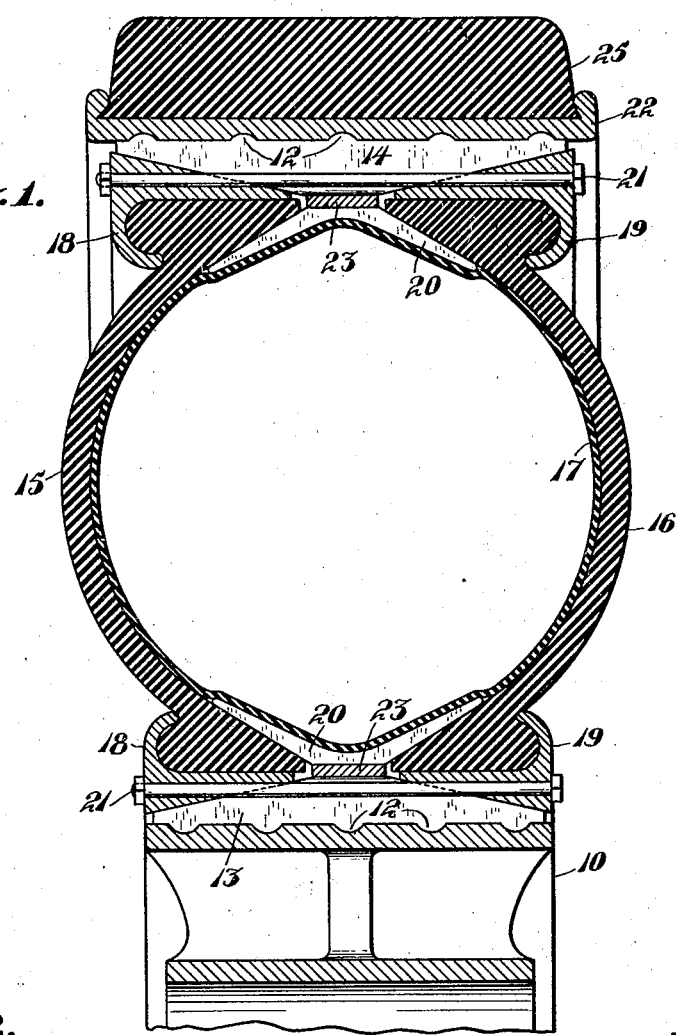
Fig.1.
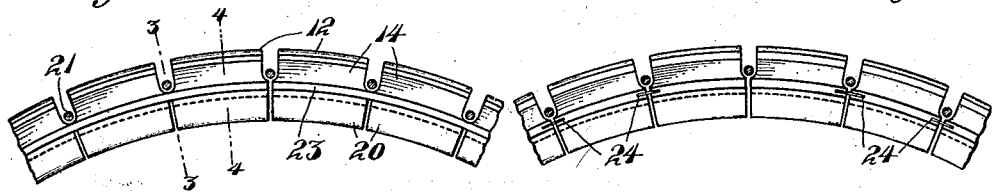
Fig.2.   Fig.5.
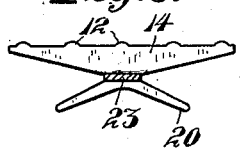   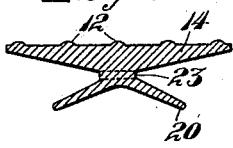
Fig.3.   Fig.4.
Inventor
Alexis Jakovleff
By Strong & Townsend
Attorneys

UNITED STATES PATENT OFFICE.

ALEXIS JAKOVLEFF, OF SAN FRANCISCO, CALIFORNIA, ASSIGNOR TO JAK TIRE CORPORATION, OF SAN FRANCISCO, CALIFORNIA, A CORPORATION OF CALIFORNIA.

SECTIONAL PNEUMATIC TIRE.

1,335,712.    Specification of Letters Patent.    Patented Mar. 30, 1920.

Application filed July 9, 1918, Serial No. 244,064.  Renewed August 18, 1919.  Serial No. 318,312.

*To all whom it may concern:*

Be it known that I, ALEXIS JAKOVLEFF, a subject of the Emperor of Russia, residing in the city and county of San Francisco and State of California, have invented new and useful Improvements in Sectional Pneumatic Tires, of which the following is a specification.

This invention relates to a pneumatic tire and particularly pertains to a sectional tire structure.

It is the principal object of the present invention to provide a pneumatic tire which is composed of elements adapted to be assembled to form the tire casing and which are further provided to receive a demountable tire tread by which the elements are secured in position and their renewal easily effected.

Other objects will appear hereinafter.

The present invention embodies the use of a tire casing composed of annular halves adapted to be combined in a manner to inclose a pneumatic tire tube and which are further provided with an outer tread band for receiving the wear upon the tire, said band being fitted with a mounting by which the casing halves may be rigidly secured together.

One embodiment of my invention is disclosed in the accompanying drawings in which:

Figure 1 is an enlarged transverse sectional view through the tire and its mounting.

Fig. 2 is a fragmentary view in elevation illustrating one of the metallic tire bands employed to hold the tire in position in relation to its wheel and its outer rim.

Fig. 3 is a view in transverse section on the line 3—3 of Fig. 2.

Fig. 4 is a view in section on the line 4—4 of Fig. 2.

Fig. 5 is a view disclosing a modification of the member shown in Fig. 2 in which said member is formed by uniting a series of sectional elements.

Referring to the drawings, 10 indicates a vehicle wheel here shown as formed of metal having a hub and felly. The felly is formed with a series of laterally spaced circumferential grooves providing seats with which annular ribs 12 upon a lock band 13 register. The band 13 is of metal and corresponds in sectional formation to an outer band 14, which will be hereinafter described. This first named band is provided as a means for securing the inner edges of tire casing sections 15 and 16 to the wheel. The sections 15 and 16 are of arcuate formation and are made of resilient and fibrous material according to any desired method.

The casing halves which are complementary and extend continuously around the wheel form an annular compartment within which a pneumatic tire tube 17 is inclosed. The outer and inner diameters of each casing section are formed with outwardly and laterally extending flanges by which the sections are secured in relation to their fittings. The inner edges of the sections and their flanges are adapted to rest upon clamping rings 18 and 19, which are disposed at the opposite sides of the wheel and therearound. These rings are formed with their outer faces shaped to conform to the contour of the inner edges of the tire and their flanges, thus securing them against displacement and submitting them to clamping action of the rings 18 and 19. The rings coöperate with an inner flange ring 20 which is formed as a part of the lock band 13. This flange member extends outwardly over the opposite sides of the tire casing and holds the flanges against movement as they are bound by the rings 18 and 19. These rings are simultaneously drawn together by bolts 21 which extend laterally of the wheel and pass through openings along the two rings.

It is to be noted that the inner circumferences of the main body of the rings are beveled inwardly. This bevel face conforms with faces upon the band 13 and insures that a movement to draw the rings together will cause them to be expanded and to firmly clamp the inner tire ends between them and the flange portions 20 of the band 13.

The outer edges of the casing parts are clamped in a manner identical with that of their inner edges. This is made possible due to the fact that the sectional formation of the rings 13 and 14 are the same, although the annular flange 20 is turned inwardly and circumscribes the entire circumference of the body portion rather than the outer circumference as in the former case. Agreeing with this reversal in the design, the clamping rings 18 and 19 have clamping flanges inverted to extend inwardly and engage the outwardly extending flange portions of the casing. This construction insures that the inner and outer edges of the casing parts will be securely held and bound by metallic members which exert a clamping action from the inside and the outside of the casing parts, thus rigidly holding these members against separation and adequately securing them to withstand the atmospheric expansion within the tube 17 as it is increased by the weight of the vehicle as well as the road shock delivered to the casing tread.

In view of the fact that the outer ring 14 is adapted to carry a tread hoop 22, and that it is desirable to provide a flexible support therefor, the outer band 14 may be formed as shown in either of Figs. 2 or 5. In the first instance it will be noted that radial serrations are cut through the body portion of the band to provide a passageway for the bolts of the clamping rings. These serrations are of the proper dimensions to allow clearance between their sides and the bolts, thus preventing a shearing action of the bolts. The annular flange portion 20 of the band is also serrated and will thus become weakened so that the band when considered as a unit will be slightly flexible throughout its circumference. It will be understood that the body portion of the bands and their annular flange portions are united by a continuously extending web 23 which is unbroken save at one point of joint as shown in Fig. 2. By forming the band as described it will readily conform to the contour of the tire casing and will also act to permit local shock to be directly absorbed by the pneumatic tire without transmitting it to the entire outer metallic structure.

In the form of the band shown in Fig. 5 the structure is a composite one being made up of a series of arcuate segments spaced in relation to each other and united by spring plates 24 which extend in slots formed in the adjacent ends of the segments. This structure provides additional flexibility of the band.

The outer band 14 is provided with outwardly extending beads corresponding to the beads 11 of the inner band. In this instance the beads register with grooves formed around the inner circumference of the tread hoop 22, thus insuring that the hoop will be securely fastened over the band when the band is expanded by the action of the rings 18 and 19. This hoop has opposite flanges adapted to extend along the opposite sides of a cushion tire tread 25. The tread may be of any construction and may be formed of any suitable material.

In mounting a tire of the present type upon a wheel, the band 13 is first positioned around the grooved circumference of the wheel, after which the opposite tire sections are placed with their inner edges extending in the opposite annular V shaped grooves of the band as formed by the annular flange member 20, and the band body. When this has been done the wedge shaped clamping rings 18 and 19 may be placed in position. When these rings are drawn together by their bolts the band will be caused to contract around the wheel with its beads firmly seating within the wheel grooves. At the same time the band will force the inner edges of the casing sections against the inclined faces of the annular flange 20 and act to firmly secure the casing to the band. This action will be abetted by the shrinking action of the flange 20 as effected by the clamping rings. When the tire sections have been thus secured the tube may be disposed between them, after which the outer band 14 is positioned in relation to the outer edges of the sections. This band and the sections are then clamped together by the outer clamping rings, it being understood that prior to this clamping action the tread hoop 22 will have been placed in position around the band. The movement of the outer clamping rings will expand the band 14 and will cause the edges of the sections to be securely held in a similar manner to the holding of the inner sections. When the tire has been thus completely assembled it is ready for use and will afford means for absorbing local road shocks at the rim of the wheel as well as absorbing major road shocks which are transmitted throughout the circumference of the wheel.

Having thus described my invention, what I claim and desire to secure by Letters Patent is—

1. A pneumatic tire comprising an inflating tube, a casing comprising a pair of annular side walls adapted to combine to form a cavity of circular cross section, within which the tube is inclosed, means for simultaneously fastening the inner edges of said walls in fixed relation to each other and to the wheel upon which the tire is positioned, a tread ring circumscribing the casing, means for simultaneously securing the outer edges of said casing parts in fixed relation to each other and the tread ring, and means for producing limited flexibility of said outer and inner clamping means.

2. In a sectional casing structure for tires, an annular web, and annular means extending outwardly from each side of the web, said means being each formed to provide substantially wedge-shaped grooves to receive the edges of the casing sections, and means to secure the casing edges in said grooves.

3. In a sectional casing structure, the combination of a rim band having wedge-shaped grooves at each side extending circumferentially, and flanged retaining means engaging in said grooves, said rim band being cut at intervals for producing limited flexibility.

4. In a sectional casing structure for tires, an annular web, and annular means extending outwardly from each side of the web, said means being each formed to provide substantially wedge-shape grooves to receive the edges of the casing sections, and means coöperating with one of the walls of the wedge-shaped grooves of each of the first named means to force the casing sections against the opposite walls of the grooves.

5. In a tire, a casing having a circumferential line of division, and retaining means for the edges formed by said line of division including a unitary device having opposite side recesses the walls of which diverge and receive the casing edges in the opposite side recesses thereof, said device having spaced cuts in its opposite sides so as to render same flexible.

6. In a tire, a casing having a circumferential line of division, retaining means for the edges formed by said line of division including an annular central web arranged between the casing edges, and an upper and a lower pair of flanges borne by the web, the flanges of each pair being divergently related and the upper pair engaging on the inner faces of the tire edges and the lower pair being disposed below the casing edges.

7. In a tire, a divided casing, and means to secure the casing edges resultant from dividing same including an interconnected series of relatively yieldable elements having lateral recesses in the side edges thereof, said recesses opening outwardly of the elements to receive the casing edges from the outer sides of the elements.

8. In a tire, a peripherally divided casing, sectional flexible means for connecting the casing edges, said means having outwardly opening lateral recesses in their side edges to receive the casing edges from the outer sides of the elements, and means to secure the casing to a wheel.

9. In a tire, a peripherally divided casing, flexible means for connecting the casing edges, said means having outwardly opening recesses in their side edges to receive the casing edges from the outer sides of said means, a tread supported from said flexible means, and means to secure the casing to a wheel.

10. In a tire, a divided casing, an annular member having side recesses receiving the casing edges resultant from the division thereof, said member being transversely slotted at intervals, retaining means for each casing edge to hold the latter in the respective recesses of said member, and bolts connecting the retaining means and extending through the slots of the member.

11. In a tire, a divided casing, and means to secure the casing divisions together, including a band and a series of means on each side of the band and extending outwardly from the band sides to receive the casing edges, said means being spaced so as to be capable of independent movement.

In testimony whereof I have hereunto set my hand in the presence of two subscribing witnesses.

ALEXIS JAKOVLEFF.

Witnesses:
ALVA MILLER,
CONSTANCE M. GAMMETER.